United States Patent [19]

Saegusa et al.

[11] 4,412,730

[45] Nov. 1, 1983

[54] METERING DEVICE

[75] Inventors: Takashi Saegusa, Sagamihara; Toru Fukuhara, Isehara, both of Japan

[73] Assignee: Nippon Kogaku K.K., Tokyo, Japan

[21] Appl. No.: 295,003

[22] Filed: Aug. 21, 1981

[30] Foreign Application Priority Data

Aug. 28, 1980 [JP] Japan ................................ 55-118920
Aug. 28, 1980 [JP] Japan ................................ 55-118921

[51] Int. Cl.³ .......................... G03B 7/08; G03B 7/28; G01J 1/44
[52] U.S. Cl. ...................................... 354/31; 356/222
[58] Field of Search ............... 354/22, 23 R, 31, 60 R; 356/221, 222, 226; 250/208, 209, 214 P

[56] References Cited

U.S. PATENT DOCUMENTS 4,214,826  7/1980  Uchida et al. ..................... 354/31

Primary Examiner—William B. Perkey
Attorney, Agent, or Firm—Fitzpatrick, Cella, Harper & Scinto

[57] ABSTRACT

A metering device for metering an object field by dividing it into a plurality of areas and producing a plurality of metering outputs corresponding to the brightnesses of said areas includes means for extracting from the plurality of metering outputs a plurality of reference outputs different in level from one another, means for evaluating the level of at least one of the reference outputs, and means responsive to the evaluating means to select and put out one of the reference outputs.

9 Claims, 18 Drawing Figures

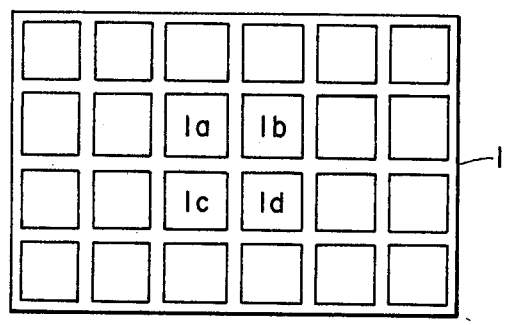
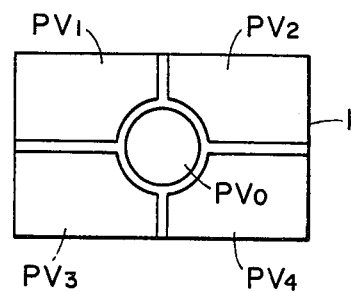
FIG. 1                    FIG. 2
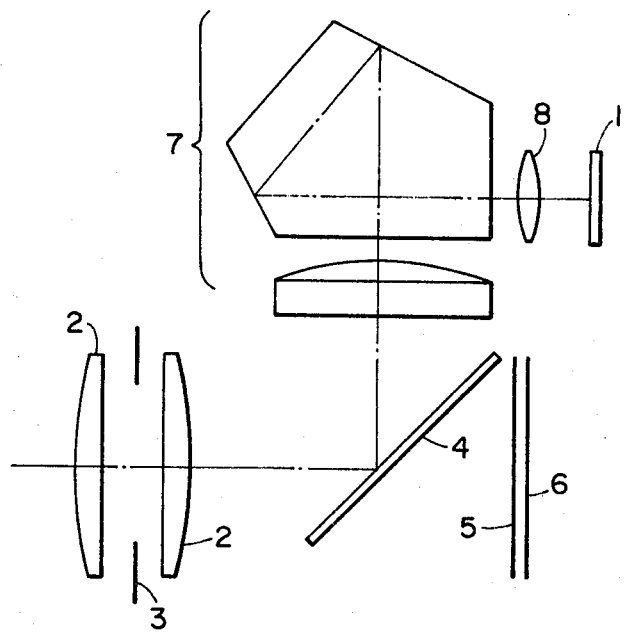
FIG. 3

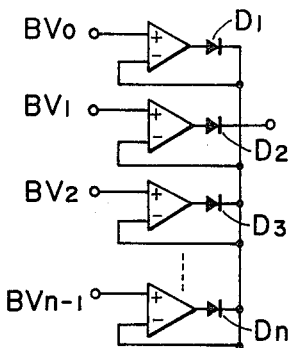
FIG. 7A
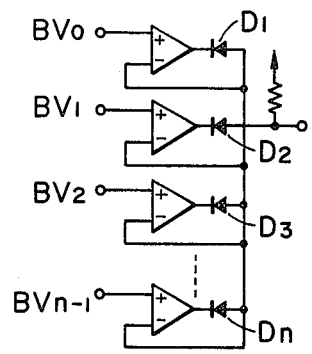
FIG. 7B
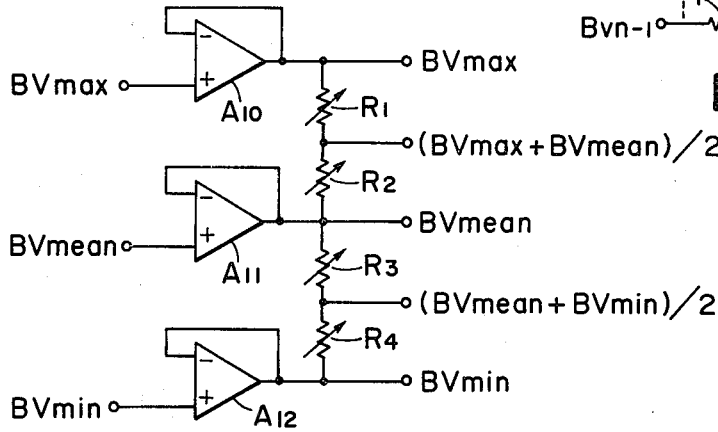
FIG. 8
FIG. 9
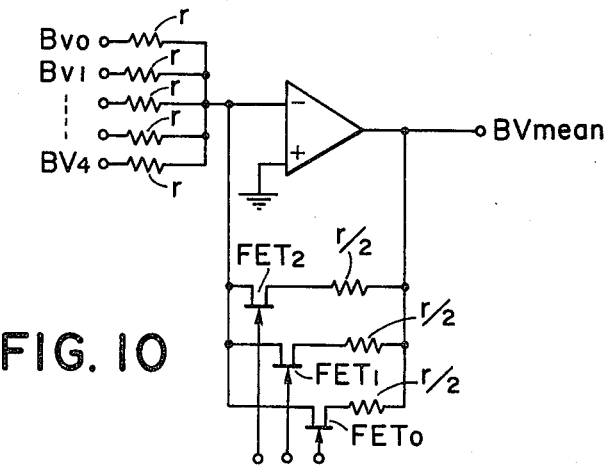
FIG. 10

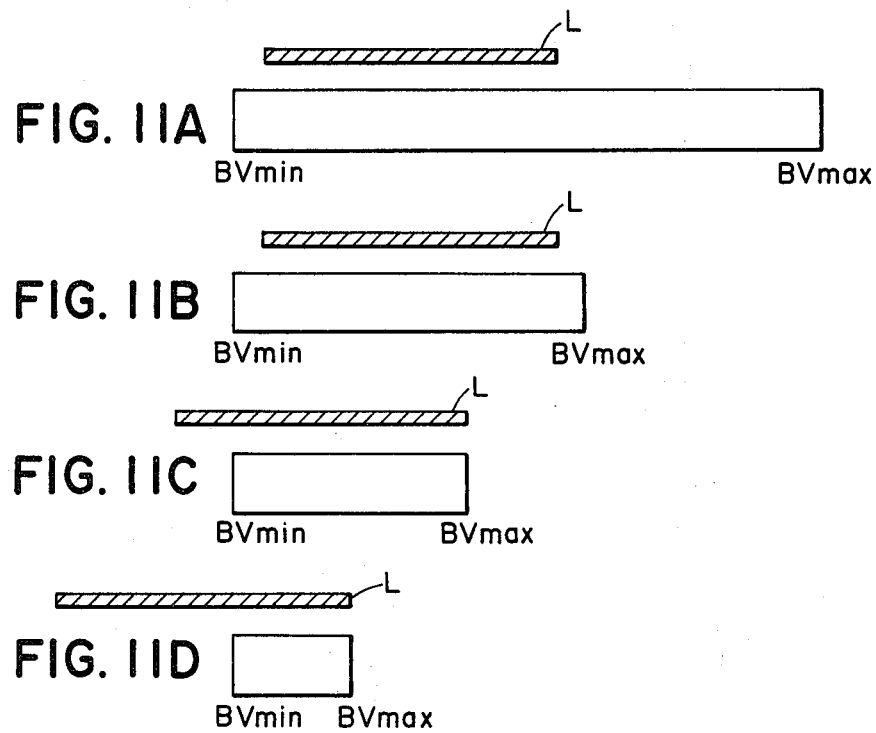
FIG. 11A
FIG. 11B
FIG. 11C
FIG. 11D
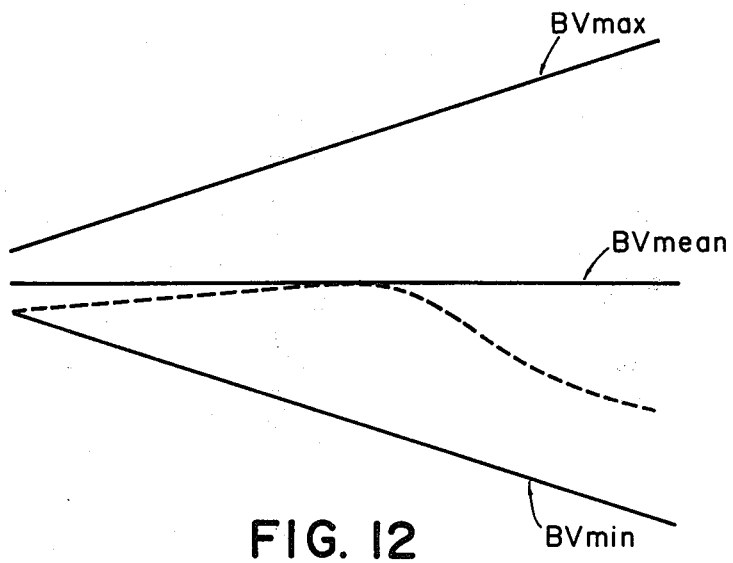
FIG. 12

METERING DEVICE

BACKGROUND OF THE INVENTION

1. Field of the Invention

This invention relates to a metering device suitable for a photographic camera, and more particularly to a metering device which meters an object field by dividing it into a plurality of areas and produces a proper metering output for imparting a proper exposure to the entire photographing picture plane on the basis of metering outputs corresponding to the plurality of areas.

2. Description of the Prior Art

Difficult problems in metering an object field lie in judging the position at which a subject intended by the photographed exists with respect to the object field which can be expressed by the distribution of luminance, and determining the exposure value necessary to photograph the subject. For example, as an exposure determining system for solving the above-noted problems, there is a center priority metering system. This is a system whereby the brightness of the central portion of an object to be photographed is metered and the exposure amount is determined on the basis of the metered value. However, when this metering system is resorted to, no proper exposure can be obtained where the subject does not exist in the central portion of the picture plane. It often occurs that the subject of photography exists in the marginal portion of the picture plane and therefore, the conventional center priority metering system has a disadvantage in that the probability with which a proper exposure is obtained is low.

Japanese Patent Publication No. 33794/1972 discloses a metering system whereby the entire object field which is the object of metering is divided into suitable small areas and a geometrical mean value, a maximum value, a minimum value, contrast, an arithmetical mean value, etc. are obtained from the metered values of the areas.

This metering system is very excellent as a method of obtaining metering data which provide the basis for judgment for obtaining a desired exposure amount of object fields of various luminance distributions or for photography directed to various purposes. However, it is not easy to judge what exposure amount should actually be imparted on the basis of the obtained metering data.

Further related examples of the prior art include Japanese Patent Publication No. 9271/1976 which discloses a technique in which the arithmetical mean value of the maximum value and the minimum value of a plurality of metering outputs is used as a proper metering output, and Japanese Laid-open Patent Application No. 17725/1978 which discloses a technique in which the intermediate value of the maximum value and the minimum value is manually extracted by the photographer and this intermediate value is used as a proper metering output.

However, these prior arts have the following disadvantages. That is, in a case where the exposure is determined by the arithmetical mean value, the major object sometimes becomes under-exposed or over-exposed under special object field conditions such as counterlight conditions or conditions in which the major object lies on the snow. Also, setting the intermediate value so as to be a proper exposure under the above-mentioned special object field conditions not only requires skill, but also unavoidably involves the reduction of operability because the setting operation is manual.

SUMMARY OF THE INVENTION

It is an object of the present invention to provide a metering device which produces a metering output capable of providing a proper exposure with respect to an object which is the subject of photography for an object field having any luminance distribution.

The metering device according to the present invention includes means for metering an object field by dividing it into a plurality of areas and producing a plurality of metering outputs corresponding to the plurality of areas, means for selecting and/or combining from among the metering outputs several reference outputs different in level from one another, means for evaluating the relative level of at least one of the reference outputs, and means for selecting one of the reference outputs as a proper metering output in accordance with said evaluation.

The invention will become more fully apparent from the following detailed description thereof taken in conjunction with the accompanying drawings.

BRIEF DESCRIPTION OF THE DRAWINGS

FIG. 1 is a plan view showing an example of the light-receiving device.

FIG. 2 is a plan view of another example of the light-receiving device.

FIG. 3 is a schematic view showing the optical system of a camera having the light-receiving device mounted thereon.

FIG. 7A is a circuit diagram showing an embodiment of the maximum value output circuit.

FIG. 7B is a circuit diagram showing an embodiment of the minimum value output circuit.

FIG. 8 is a circuit diagram showing an embodiment of the mean value output circuit.

FIG. 9 is a circuit diagram showing an embodiment of the intermediate value output circuit.

FIG. 10 is a circuit diagram showing another embodiment of the mean value output circuit.

FIG. 11 illustrates the relation between the luminance ranges of various scenes to be photographed and the latitude of film.

FIG. 12 illustrates the brightness which is to be the basis for exposure setting relative to the brightness difference in an object field.

DESCRIPTION OF THE PREFERRED EMBODIMENTS

Figure 4:
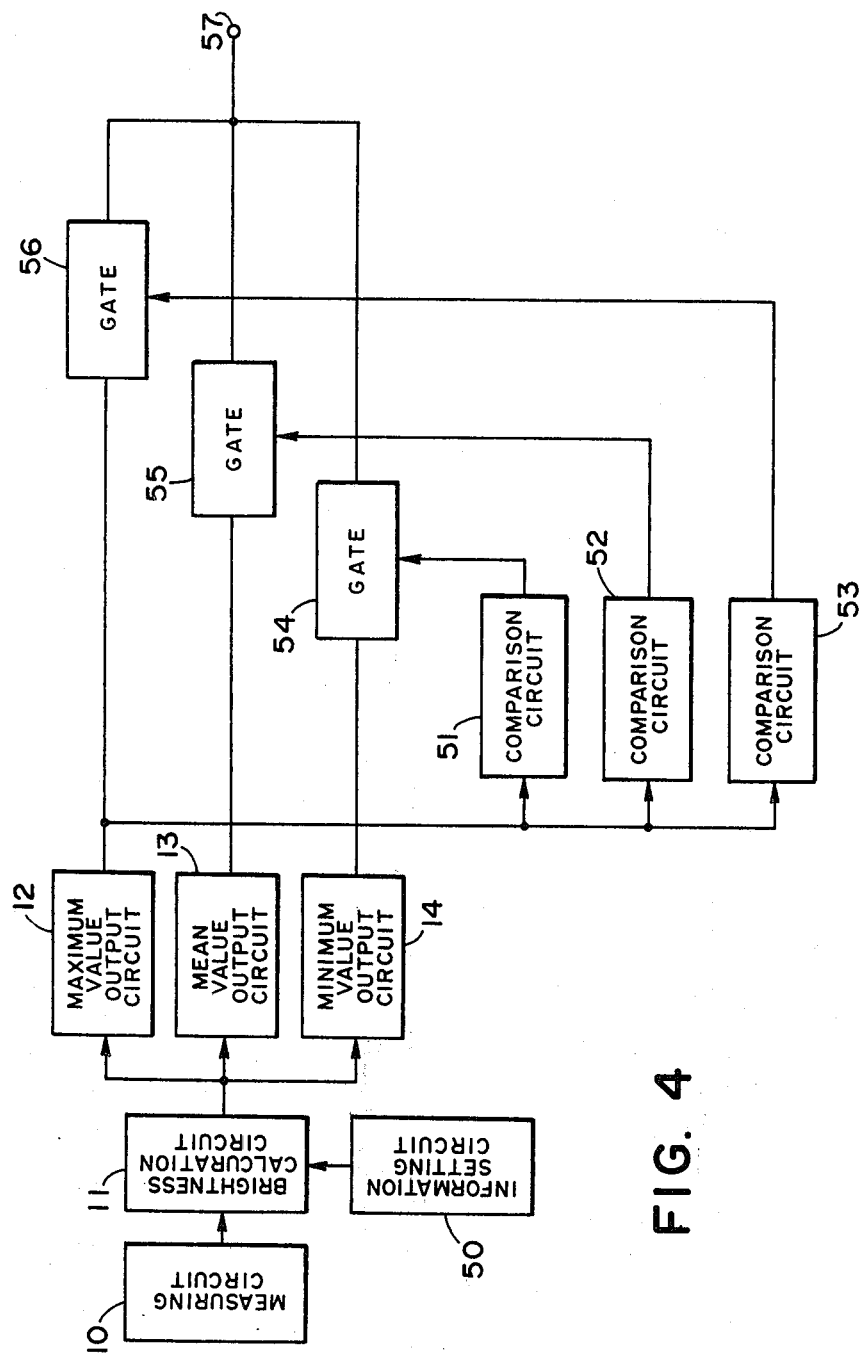
FIG. 4 is a block diagram of the device according to a first embodiment of the present invention.
Figure 5:
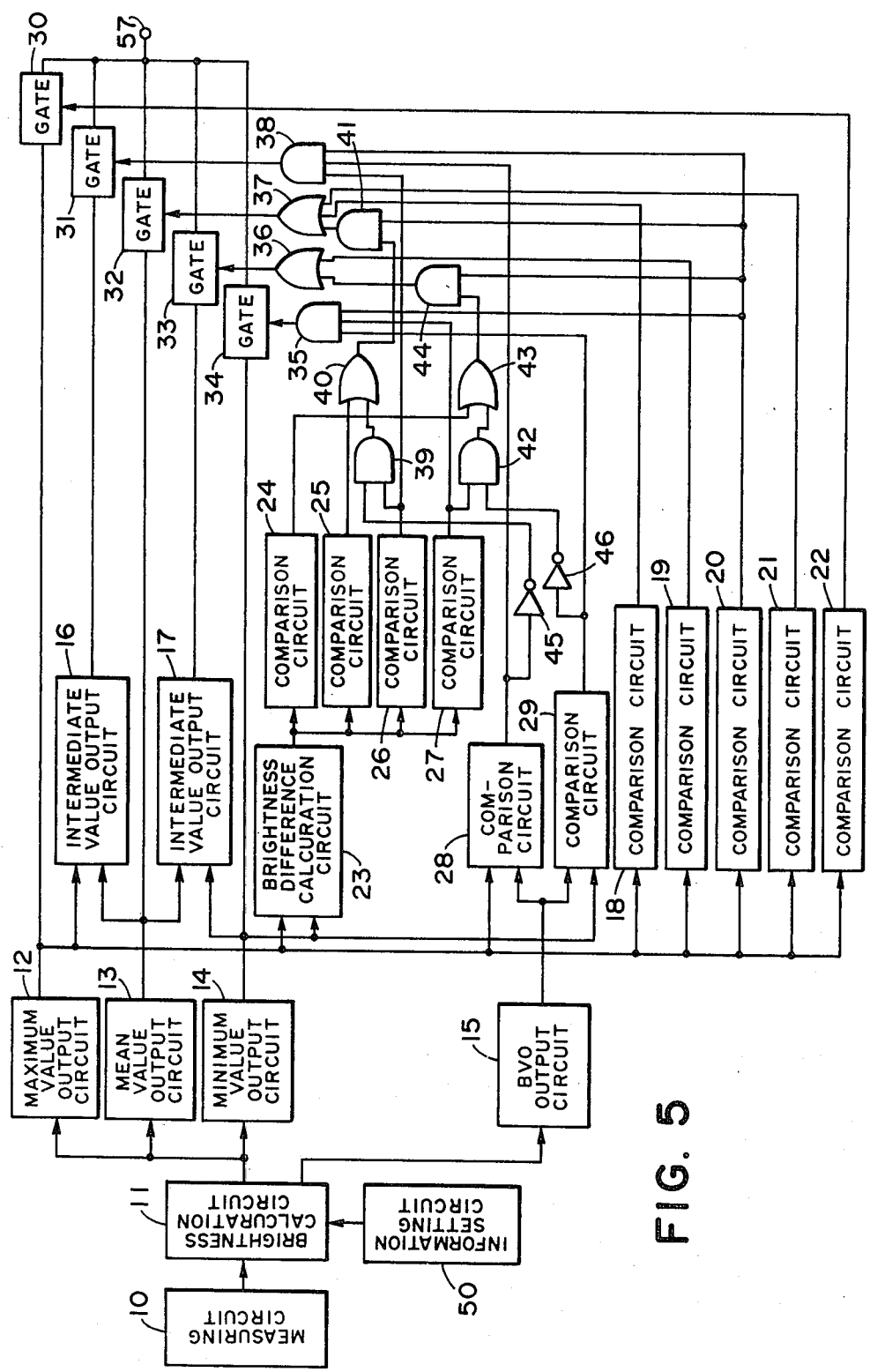
FIG. 5 is a block diagram of the device according to a second embodiment of the present invention.

FIG. 1 shows an example of the light-receiving device used with the present invention. The light-receiving device 1 is a two-dimensional image sensor such as a photodiode array or a CCD. In FIG. 1, it comprises 4×6 matrix and is capable of metering with the picture plane divided into 24 areas.

FIG. 2 shows an example of the light-receiving device 1 in which the number of divisions of the picture plane is reduced and in this example, metering output can be obtained as ones corresponding to the center of picture plane $PV_0$, the left upper part of picture plane $PV_1$, the right upper part of picture plane $PV_2$, the left lower part of picture plane $PV_3$ and the right lower part of picture plane $PV_4$.

FIG. 3 shows a camera having the light-receiving device 1 mounted thereon. The object light passes through a lens 2, a diaphragm 3 and a mirror 4 to a viewfinder optical system 7. The object image is formed on the light-receiving device 1 by an imaging lens 8. There are shown a focal plane shutter 5 and a film 6.

FIG. 4 is a block diagram showing the basic construction of a first embodiment of the present invention. A measuring circuit 10 includes the light-receiving device 1 shown in FIG. 2, and puts out TTL open metering outputs $PV_0$–$PV_4$ of the various areas of the photographing picture plane. These outputs are reduced by the minimum aperture value $AV_0$ (apex value) of the lens as a factor of the reduction in quantity of light caused by TTL metering for the luminance values $BV_0$–$BV_4$ (apex values) of the various areas of the divided picture planes. That is, $$PV_0 = BV_0 - AV_0$$
$$PV_1 = BV_1 - AV_0$$
$$\vdots$$
$$PV_4 = BV_4 - AV_0$$

A brightness calculation circuit 11 introduces a plurality of metering outputs $PV_j = BV_j - AV_0$ (j=0–4) circuit 10 and the minimum aperture value $AV_0$ of the lens from an information setting circuit 50, and sums up these to obtain each absolute luminance $BV_j$. A maximum value output circuit 12, a mean value output circuit 13 and a minimum value output circuit 14 receive the output of the brightness calculation circuit 11 and put out a maximum value $BV_{max}$, a mean value $BV_{mean}$ and a minimum value $BV_{min}$, respectively. Comparison circuits 51–53 receive the output $BV_{max}$ of the maximum value output circuit 12 as input, and alternatively produce an output of logic "1" in accordance with the level of $BV_{max}$. For example, the comparison circuit 51 puts out "1" when $BV_{max} \leq 9$, the comparison circuit 52 puts out "1" when $0 \leq BV_{max} < 9$, and the comparison circuit 53 puts out "1" when $BV_{max} < 0$, and these circuits put out a logic "0" during the other times. Gate circuits 54–56 have the outputs of the comparison circuits 51–53 applied thereto to alternatively put out the maximum value BVmax, the mean value BVmean and the minimum value BVmin to an output terminal 57. When maximum value $BVmax \leq 9$:

This is a case of a scene in which the picture plane includes therein objects of considerably high brightness for example, the sun and bright clouds or a clear sky. Accordingly, in this case, the major object often exists on the low brightness side and the exposure is adjusted to the luminance in the vicinity of the minimum value BVmin to prevent the object on the low brightness side from being defaced darkly. When this is done, there is a fear that the object on the high brightness side would be blown off brightly, but since the film has a latitude, proper exposure is also obtained on the relatively high brightness side.

Therefore, the comparison circuit 51 puts out "1" and the gate 54 is opened to transmit the minimum value BVmin to the output terminal 57. When maximum value $0 \leq BVmax < 9$:

This is a case of a common daytime outdoor or indoor scene or an evening scene. In the photography of such scene, the major object intended by the photographer exists but it will often be the case that the exposure is adjusted only to the major object and the other objects are defaced darkly or blown off brightly to make the resultant photography meaningless. Accordingly, in this case, it is necessary that the exposure be adjusted to the entire picture plane and therefore, the exposure is adjusted to the luminance in the vicinity of the mean value BVmean.

Therefore, the comparison circuit 52 puts out "1" and the gate 55 is opened to transmit the mean value BVmean to the output terminal 57. When maximum value $BVmax < 0$:

An example of this time is a night scene. In a night scene, the major object lies in a high luminance area and so, the exposure is adjusted to the luminance in the vicinity of the maximum value BVmax.

Therefore, the comparison circuit 53 puts out "1" and the gate 56 is opened to transmit the maximum value BVmax to the output terminal 57.

The output of the output terminal 57 (the proper metering output) is applied to a proper exposure operating circuit which is known per se, and is used for the operation of a proper aperture value or shutter speed with the other exposure factors. Exposure control and/or proper exposure display is effected on the basis of this operation output.

The above-described embodiment demonstrates its effect when the object field does not exhibit a complicated luminance distribution, but if the luminance distribution is complicated, it will sometimes be not coincident with the exposure intended by the photographer. An embodiment which solves this problem will now be described.

Figure 6:
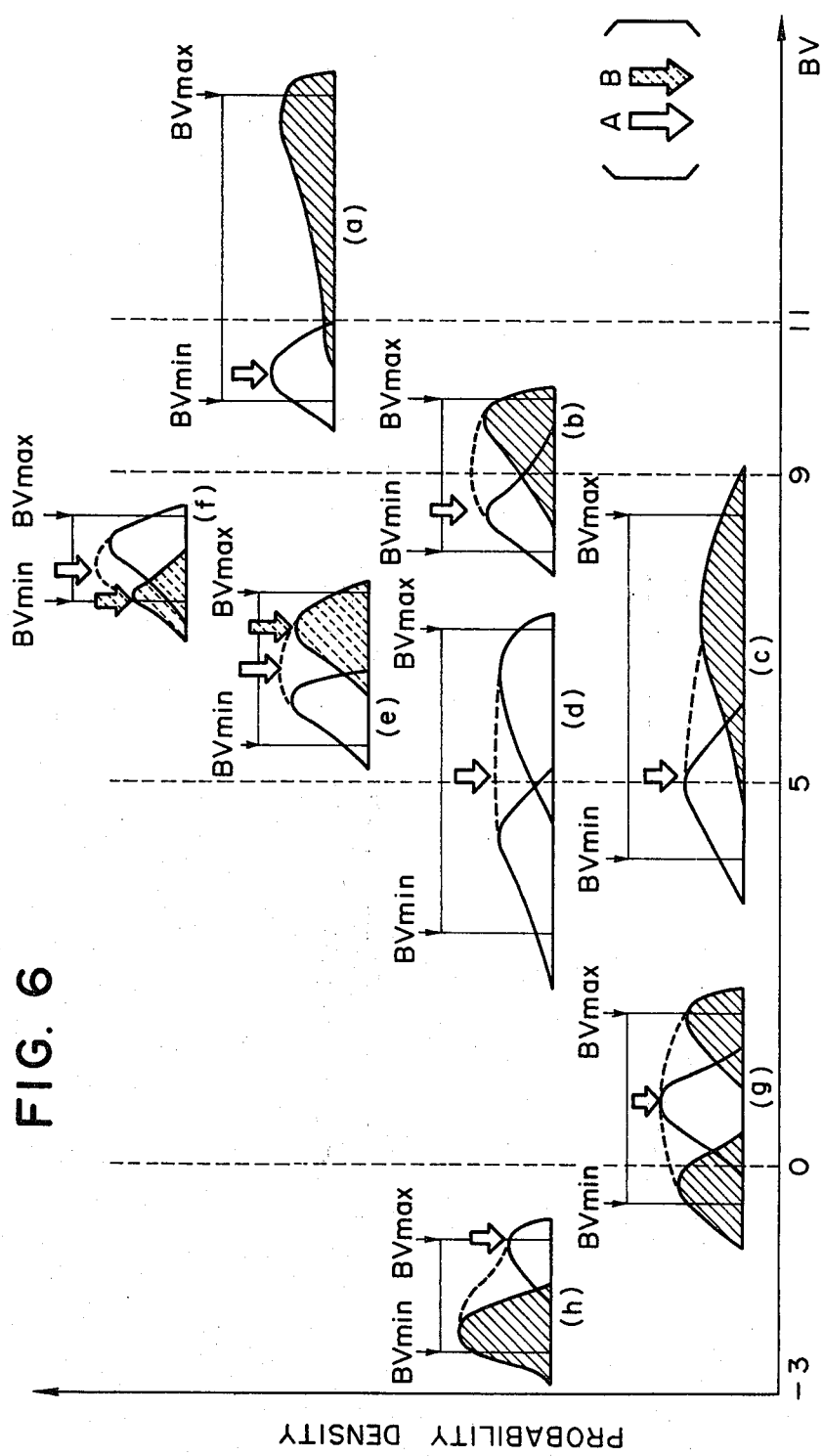
FIG. 6 illustrates the luminance distributions in various scenes to be photographed.

FIG. 6 is a block diagram of a second embodiment of the present invention. A measuring circuit 10, including a light-receiving device 1, puts out the metering outputs $PV_0, PV_1, \ldots, PV_{n-1}$ of the various parts of the photographing picture plane. Since usually TTL metering is effected, these outputs are reduced by the minimum aperture value $AV_0$ of the lens for the luminances $BV_0, BV_1, \ldots, BV_{n-1}$ of the various areas of the picture plane. That is, $$PV_0 = BV_0 - AV_0$$
$$PV_1 = BV_1 - AV_0$$
$$\vdots$$
$$PV_{n-1} = BV_{n-1} - AV_0$$

$PV_0$ and $BV_0$ are defined as the metering output and luminance, respectively, of the center of the picture plane.

A brightness calculation circuit 11 sums up the metering output $PV_j = BV_j - AV_0$ (j=0–n−1) obtained by the measuring circuit 10 and the minimum aperture diameter value $AV_0$ from an information setting circuit 50 to obtain an absolute luminance $BV_j$. Circuits 12, 13 and 14 are ones for calculating the maximum value BVmax, the mean value BVmean and the minimum value BVmin, respectively. The output of a mean value output circuit 13 is not taken into account when the luminance of each area exceeds a predetermined value (for example, $BV=11$). Also, when the number of areas whose luminance exceeds a predetermined value exceeds a predetermined number, calculation is effected with the luminances of such areas being all regarded as a predetermined value (for example, $BV=11$). For example, when the object field is divided into 5 areas as shown in FIG. 2 and if the luminances of the various areas are $BV_0=10$, $BV_1=12$, $BV_2=11$, $BV_3=10$ and $BV=10.5$, then $BVmean=(10+10+10.5)/3=10.2$ is put out as the mean value with $BV_1$ and $BV_2$ being neglected.

Also, if the luminances of the various areas are $BV_0=11.5$, $BV_1=12.5$, $BV_2=12$, $BV_3=10.5$ and $BV_4=10.5$, then $BV_0$, $BV_1$ and $BV_2$ are too many in number to be neglected and therefore, with only one of $BV_0$, $BV_1$ and $BV_2$ being regarded as $BV=11$, $BVmean=(11+10.5+10.5)/3=10.7$ is put out as the mean value.

Intermediate value output circuits 16 and 17 put out (BVmax+BVmean)/2 and (BVmin+BVmean)/2, respectively. Circuit 15 puts out the luminance value $BV_0$ of the center of picture plane. However, where the number of divisions is great as in FIG. 1, it puts out the mean value of luminances based on the metering outputs of several light-receiving elements in the center of the picture plane. Comparison circuits 18-22 receive the maximum value BVmax as input, and only one of these comparison circuits puts out a logic "1" in accordance with the luminance level of BVmax. That is, the comparison circuit 18 puts out "1" when BVmax$\leq$11.

The comparison circuit 19 puts out "1" when 11>BVmax$\geq$9.

The comparison circuit 20 puts out "1" when 9>BVmax$\geq$5.

The comparison circuit 21 puts out "1" when 5>BVmax$\geq$0.

The comparison circuit 22 puts out "1" when 0>BVmax.

A brightness difference output circuit 23 calculates $dBV=BVmax-BVmin$ (unit: EV) from the outputs of a maximum value output circuit 12 and a minimum value output circuit 14. Comparison circuits 24-27 receive the output dBV of the brightness difference output circuit as input, and alternatively put out "1" in accordance with the level of the output dBV.

Numerical values will be shown specifically below.

The comparison circuit 24 puts out "1" when dBV$\geq$5[EV]. The comparison circuit 25 puts out "1" when 5>dBV$\geq$3[EV]. The comparison circuit 26 puts out "1" when 3>dBV$\geq$3/2[EV]. The comparison circuit 27 puts out "1" when 3/2>dBV[EV].

Comparison circuit 28 receives as inputs the luminance value $BV_0$ of the center of the picture plane which is the output of the circuit 15 and the maximum value BVmax which is the output of the maximum value output circuit 12, and puts out "1" when $BV_0 \geq BVmax - \alpha$ ($\alpha$: constant). That is, it puts out "1" when the area of high luminance lies at the center of the picture plane.

Comparison circuit 29 receives as inputs the luminance value $BV_0$ of the center of the picture plane which is the output of the circuit 15 and the minimum value BVmin which is the output of the minimum value output circuit 14, and puts out "1" when $BV_0 \leq BVmin + \alpha'$ ($\alpha'$: constant). That is, it puts out "1" when the area of low brightness lies at the center of the picture plane.

Gate circuits 30-34 receive the outputs of the circuits 12, 16, 13, 17 and 14, respectively, as inputs, and alternatively open their gates in response to the output signals of gate circuits 35-46, and select the output of the corresponding one of the circuits 12, 16, 13, 17 and 14 as the luminance adopted for the exposure operation and transmit it to an output terminal 57. This is taken into the apex operation system (not shown) of the conventional camera, and proper exposure display and exposure control are effected.

FIG. 6 shows the luminance distributions in various scenes, the horizontal axis thereof representing the luminance value [BV] and the vertical axis thereof representing the probability distribution. The luminance distribution in a certain scene indicated by broken line in each of graphs (a)-(h) comprises the luminance distribution of the major object indicated by solid line and the luminance distribution of the other object than the major object indicated by solid line with hatching. Since metering is effected by a finite number of light-receiving elements, the positions of the maximum value and the minimum value lie slightly inwardly of the opposite ends of each graph. The difference between the maximum value and the minimum value is dBV.

Operation will now be described in accordance with the luminance pattern.

1. When BVmax$\geq$11:

This is a case where the picture plane includes therein objects of considerably high brightness, for example, the sun and bright clouds. Since the output of comparison circuit 18 is "1", an OR gate 37 becomes "1" and a gate circuit 32 is opened and BVmean is put out to the apex operation system. As already described, the mean value calculation circuit 13 effects calculation by neglecting the luminances exceeding $BV=11$ and therefore, the exposure at this time is adjusted to the major object on the low brightness side. That is, in the graph (a) of FIG. 6, objects of brightness exceeding $BV=11$ are neglected and the exposure is adjusted to the major object. At this time, the mean value BVmean (indicated by arrow A) neglects any brightness exceeding $BV=11$ and is therefore equal to the mean value itself of the major object. When such neglect is not made, BVmin is selected as in the embodiment of FIG. 4.

2. When 11>BVmax$\geq$9:

This is a case of an object including a clear sky and in this case, there is no extremely bright object, and there is no output which is neglected by the mean value calculation circuit 13. At this time, the output of comparison circuit 19 is "1" and the output of OR gate 36 is "1". Therefore, gate circuit 33 is opened to transmit the output (BVmin+BVmean)/2 of the intermediate value output circuit 17 to the apex operation system. With such an object, it is often the case that high brightness is a bright sky or cloud and the major object often is of low brightness, and the scene often is one for which this output is proper.

That is, the exposure is set for the luminance (BVmin+BVmean)/2 indicated by arrow A in the graph (b) of FIG. 6.

3. When 9>BVmax$\geq$5:

Such scene is a common outdoor daytime scene and in this case, the output of comparison circuit 20 is "1".

The output "1" of the comparison circuit 20, with the outputs of circuits 24-27 and circuits 28, 29, is logic-processed over a wide range and determines the output to be transmitted to the output terminal 57 in the following manner.

(a) When dBV≧5 [EV]:

The output of comparison circuit 24 is "1", the output of OR gate 43 is "1", the output of AND gate 44 is "1", the output of OR gate 36 is "1", gate circuit 33 is opened and an output (BVmin+BVmean)/2 is transmitted to the apex operation system. This is a scene of luminance distribution as shown in the graph (c) of FIG. 6 wherein the brightness difference is great and the major object exists on the low brightness side. The brightness indicated by arrow A in the graph (c) of FIG. 6 is (BVmin+BVmean)/2.

(b) When 5>dBV≧3:

The output of comparison circuit 25 is "1", the outputs of OR gate 40, AND gate 41 and OR gate 37 are "1", gate circuit 32 is opened and BVmean is transmitted to the apex operation system. Such a scene is one in which the brightness level of each area of the object is within a limited range, and can provide a good photgraph in which the dark portion is not so much defaced by adjusting the exposure to the mean value and the light portion is neither so much blown off. The mean value BVmean at this time is indicated by arrow A in the graph (d) of FIG. 6.

(c) When 3/2≦dBV<3[EV]:

The output of comparison circuit 26 is "1". At this time, the following two judgments are made.

When $BV_0 \geq BVmax - \alpha$:

The output of comparison circuit 28 is "1", the output of AND gate 38 is "1", gate circuit 31 is opened and an output (BVmax+BVmean)/2 is taken into the apex operation system.

Such a scene is one in which the brightness of the central portion of the picture plane is high and the brightness difference is relatively small and therefore, the exposure is set to correspond to the high brightness side by judging the scene as a case where a bright object has come to the central portion of picture plane to which the major object comes with high probability. The output ((BVmax+BVmean)/2 at this time is indicated by arrow B in the graph (e) of FIG. 6.

When $BV_0 < BVmax - \alpha$:

The output of comparison circuit 28 is "0", the outputs of NOT circuit 45, AND gate 39, OR gate 40, AND gate 41 and OR gate 37 are "1", gate circuit 32 is opened and BVmean is taken into the apex operation system. This is because such a scene is one for which the exposure setting based on the average metering value is best suited. The output BVmean at this time is indicated by arrow A in the graph (e) of FIG. 6.

(d) When dBV>3/2[EV]:

The output of comparison circuit 27 is "1". Again at this time, the following two judgments are made:

When $BV_0 \leq BVmin + \alpha$:

The output of comparison circuit 29 is "1", the output of AND gate 35 is "1", gate circuit 34 is opened and BVmin is taken into the apex operation system.

This is a considerably flat scene and since the central portion of picture plane in which the major object exists with high probability is of low brightness, proper exposure is obtained by setting an exposure corresponding to the low brightness portion. The output BVmin at this time is indicated by arrow B in the graph (f) of FIG. 6.

When $BV_0 > BVmin + \alpha$:

The output of comparison circuit 29 is "0", the outputs of NOT circuit 46, AND gate 42, OR gate 43, AND gate 44 and OR gate 36 are "1", gate circuit 33 is opened and (BVmin+BVmegn)/2 is taken into the apex operation system.

This is because this is a considerably flat scene and therefore, the probability with which the major object lies on the low brightness side even if the central portion of picture plane is not of low brightness, and it is better to set the exposure to correspond to the low brightness side. The output (BVmin+BVmean)/2 at this time is indicated by arrow A in the graph (f) of FIG. 6.

4. When 5>BVmax≧0:

The scene of such brightness is an evening scene or an indoor scene.

The output of comparison circuit 21 is "1", the output of OR gate 37 is "1", gate circuit 32 is opened and BVmean is taken into the apex operation system.

In the case of such a brightness range, the most preferable result will be obtained if an average exposure is given. The output BVmean at this time is indicated by arrow A in the graph (g) of FIG. 6.

5. When BVmax<0:

An example of the scene of such brightness is a night scene. The output of comparison circuit 22 is "1", gate circuit 30 is opened and BVmax is taken into the apex operation system. In a night scene, the major object is a high brightness portion and therefore, a preferable result is obtained. The output BVmax at this time is indicated by arrow A in the graph (h) of FIG. 6.

In the manner described above, from among BVmax, (BVmax+BVmean)/2, BVmean, (BVmin+BVmean)/2 and BVmin, one is taken into the apex operation system as a proper value. Let this value be BVanser. The exposure and control of display after this are a well-known apex operation technique. For example, in the case of shutter speed priority, a proper aperture value is given by $$AV = BVanser + SV - TV$$

and in the case of aperture priority, a proper shutter speed is given by $$TV = BVanser + SV - AV.$$

FIG. 7A shows an example of the maximum value output circuit 12, and FIG. 7B shows an example of the minimum value output circuit 14. These circuits are circuits known per se which use an operational amplifier and an ideal diode.

FIG. 8 shows the mean value output circuit 13 comprising resistors r and r/n and an operational amplifier $A_1$, and in this circuit, an output $(BV_1 + BV_2 \ldots BV_{n-1})/n = BVmean$ is obtained as the output of the operational amplifier.

FIG. 9 shows and example of the intermediate value output circuits 16, 17 which comprises followers $A_{1-0} - A_{12}$ and voltage dividing resistors $R_1 - R_4$.

The above-described first and second embodiments of the present invention are constructed such that the brightness on the main light source existing in the object field is classified and a proper metering output is selected and generated in accordance with the classification, but in an embodiment which will hereinafter be described, a proper metering output is obtained on the basis of another selection method.

FIGS. 11A–11D show the relations between the brightness ranges of various scenes and the latitude of film and in these Figures, the horizontal axis represents brightness (unit: apex Bv).

In such a scene as shown in FIG. 11, the difference between the maximum brightness BVmax and the minimum brightness BVmin is very great and includes, for example, an object of high brightness such as the sun and an object of low brightness such as the shade of a tree. In this case, it is very rare that the major object exists on the opposite extremities of the high brightness side and the low brightness side. If the major object exists, it often exists on the medium brightness side or on the lower brightness side. On the other hand, if the exposure is adjusted to the medium brightness, there is a possibility that the object on the lower brightness side is defaced darkly. Therefore, when the latitude L of the film is taken into consideration, a brightness intermediate the medium brightness and the lowest brightness is suitable as the brightness to which the exposure is to be adjusted. If this is done, there can be obtained a photograph in which the objects of maximum and lowest brightnesses are blown off brightly or defaced darkly but the objects of medium brightness to a relatively low brightness undergo a proper exposure. Specifically representing this, when the mean value BVmean of the maximum brightness BVmax and the minimum brightness BVmin is the medium brightness, the brightness to which the exposure is to be adjusted is given by a value intermediate the medium brightness and the minimum brightness, for example, (Bvmean+BVmin)/2. In a multi-measuring device which measures light while dividing the object field into a plurality of areas, each light-receiving element takes charge of metering of an area of a predetermined size in the object field, and at this time, each metering output has a tendency of exhibiting a characteristic biased to the bright portion of the area which takes charge of each metering. It is therefore necessary to adjust the exposure to (BVmean+BVmin)/2 in order not to have the object of low brightness defaced darkly.

In such a scene as shown in FIG. 11B, the difference between the maximum brightness BVmax and the minimum brightness BVmin is relatively great and there is no object in which the light and dark differ extremely like a landscape including a clear sky, for example, but the contrast is clear. In such case, it is preferable that the entire picture plane be photographed with a proper exposure as in common landscape photographs or souvenir photographs with a landscape as the background, and therefore, the brightness to which the exposure is to be adjusted cannot often be stopped down to any of the foreground and the background. That is, this is a scene in which the major object intended by the photographer exists but the exposure cannot be adjusted to the major object alone. In such a case, if the mean value Vmean is the brightness to which the exposure is to be adjusted, there can be obtained a photograph in which a proper exposure is provided with respect to the entire picture plane including the maximum brightness side by utilizing the latitude of the film. In this case, there is exhibited a characteristic that the metering output of each light-receiving element of the multi-measuring device is biased to the light portion, but since the exposure must be adjusted to both the high brightness side and the low brightness side, it is not necessary to attach importance to the low brightness side by going so far as to bring the high brightness portion outside the range of the latitude L of the film.

In such a scene as shown in FIG. 11C, the difference between the maximum brightness BVmax and the minimum brightness BVmin is relatively small and such scene includes, for example, a cloudy sky. In such case, unlike the case of FIG. 11B, the maximum brightness BVmax and the minimum brightness BVmin are within the range of the latitude L of the film and therefore, the brightness to which the exposure is to be adjusted may be the mean value BVmean. At this time, each light-receiving element has the aforementioned characteristic and therefore, it is when the brightness difference between the objects in the object field of which each light-receiving element takes charge is not very great that this is permitted. However, depending on the object field, the brightness difference between the objects lying there may sometimes be great. This is a time when the information of low brightness cannot sufficiently be obtained by a finite number of light-receiving elements. At such time, it is rather preferable to adjust the exposure to (BVmean+BVmin)/2 in order not to have objects of low brightness defaced darkly. When these are taken into consideration, it may be said that it is necessary to adjust the exposure in the range from BVmean to (BVmean+BVmin)/2.

In such a scene as shown in FIG. 11D, the brightness difference is very small and this is a considerably flat scene. In such case, both the high brightness side and the low brightness side are included in the range of the latitude L of the film, but as previously described, when it is taken into account that the metering output of each light-receiving element exhibits a characteristic biased to the light portion, it may be said that the brightness to which the exposure is to be adjusted may be selected in the range from (BVmean+BVmin)/2 to BVmin. If this is done, objects of low brightness can be prevented from being defaced darkly.

FIG. 12 illustrates the relation between the difference between the maximum brightness BVmax and the minimum brightness BVmin and the brightness to which the exposure is to be adjusted (indicated by dotted line). As can be seen in this Figure, if the exposure is adjusted to from BVmin to a brightness of a value intermediate BVmean and BVmin when the difference (BVmax−BVmin=dBV) between the maximum brightness and the minimum brightness is very small, and if the exposure is adjusted to a brightness substantially intermediate BVmean and BVmin when dBV is very great, and if the exposure is adjusted to a brightness between a value intermediate BVmean and BVmin to BVmean when dBV is between said two degrees, then there can be obtained a proper exposure corresponding to each object field. This principle is not genuinely theoretical, but is an empirical, statistical one obtained by carrying out actual photography, and is characterized in that the brightness to which the exposure is to be adjusted is discriminated on the basis of the difference between the maximum value and the minimum value.

Figure 13:
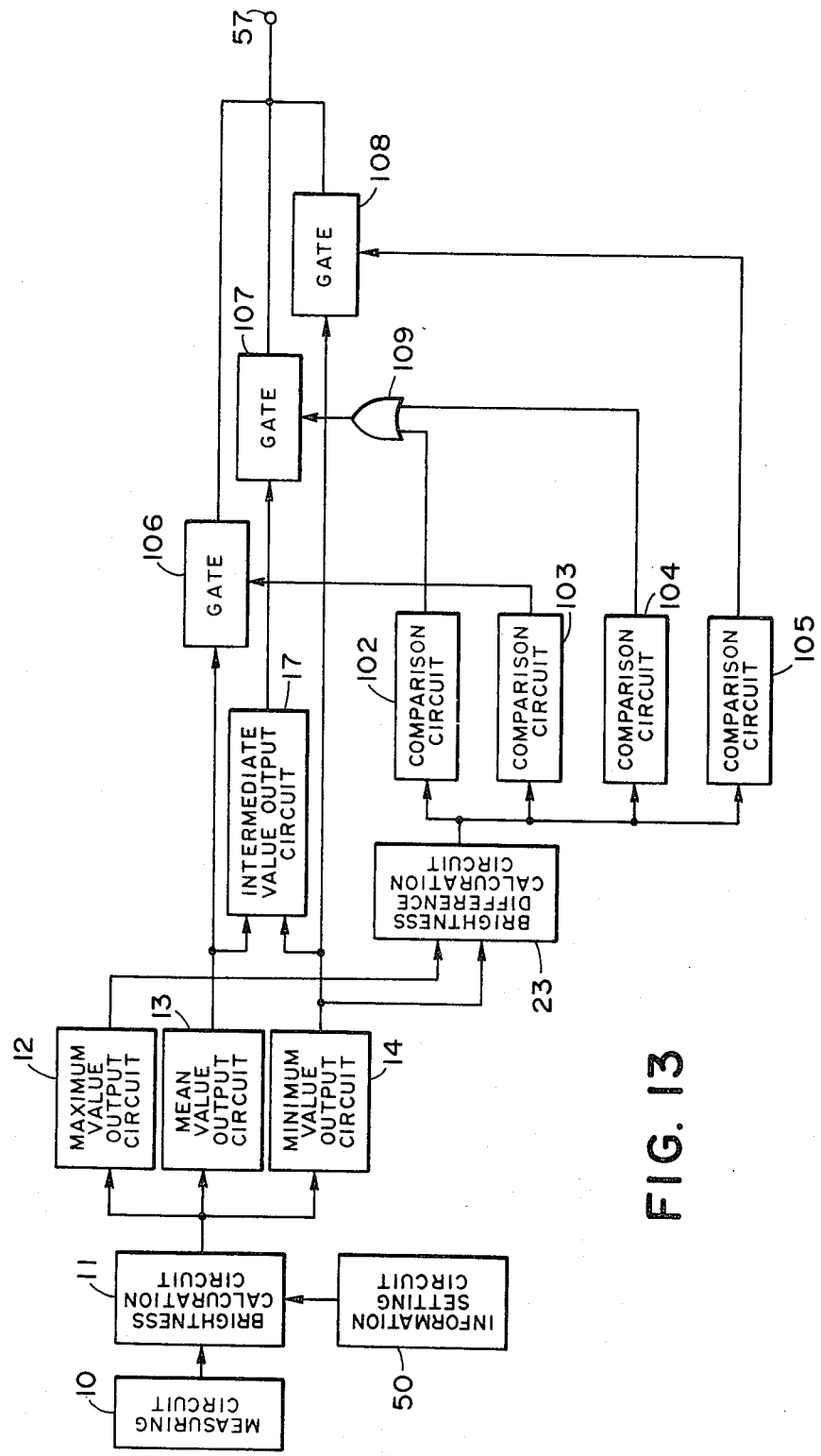
FIG. 13 is a block diagram of the device according to a third embodiment of the present invention.

FIG. 13 shows a third embodiment of the present invention which is based on the above-described principle. A measuring circuit 10 includes the light-receiving device 1 shown in FIG. 2. A brightness difference calculation circuit 23 puts out an output dBV representing the difference between the maximum value BVmax and the minimum value BVmin. One of comparison circuits 102–105 puts out a logic value "1" in accordance with the difference output dBV and a predetermined reference level. Gate circuits 106-108 selectively put out BVmean, BVmin and (BVmean+BVmin)/2 in accordance with the outputs of comparison circuits 102-105.

Operation will now be described with specific values of dBV being shown.

When the brightness difference dBV>5: Comparison circuit 102 puts out "1", and the output of OR gate 109 is "1" to open gate 107. The other comparison circuits put out "0". Therefore, the output (BVmean+BVmin)/2 of intermediate value output circuit 17 appears at an output terminal 57.

When the brightness difference is 3<dBV≦5: Comparison circuit 103 puts out "1" to open gate 106 and the output Vmean of mean value output circuit 13 appears at the output terminal.

When the brightness difference is 5/3<dBV≦3: Comparison circuit 104 puts on "1" and the output of OR gate 109 is "1" and only gate 107 is opened. Therefore, the output (BVmean+Bvmin)/2 of intermediate value output circuit 17 appears at the output terminal.

When the brightness difference dBV≦5/3: Comparison circuit 105 puts out "1" and only gate 108 is opened. Therefore, the output BVmin of minimum value output circuit 14 appears at the output terminal.

Comparison circuits 102 and 105 may be conventional comparators, and comparison circuits 103 and 104 may be wind comparators.

Figure 14:
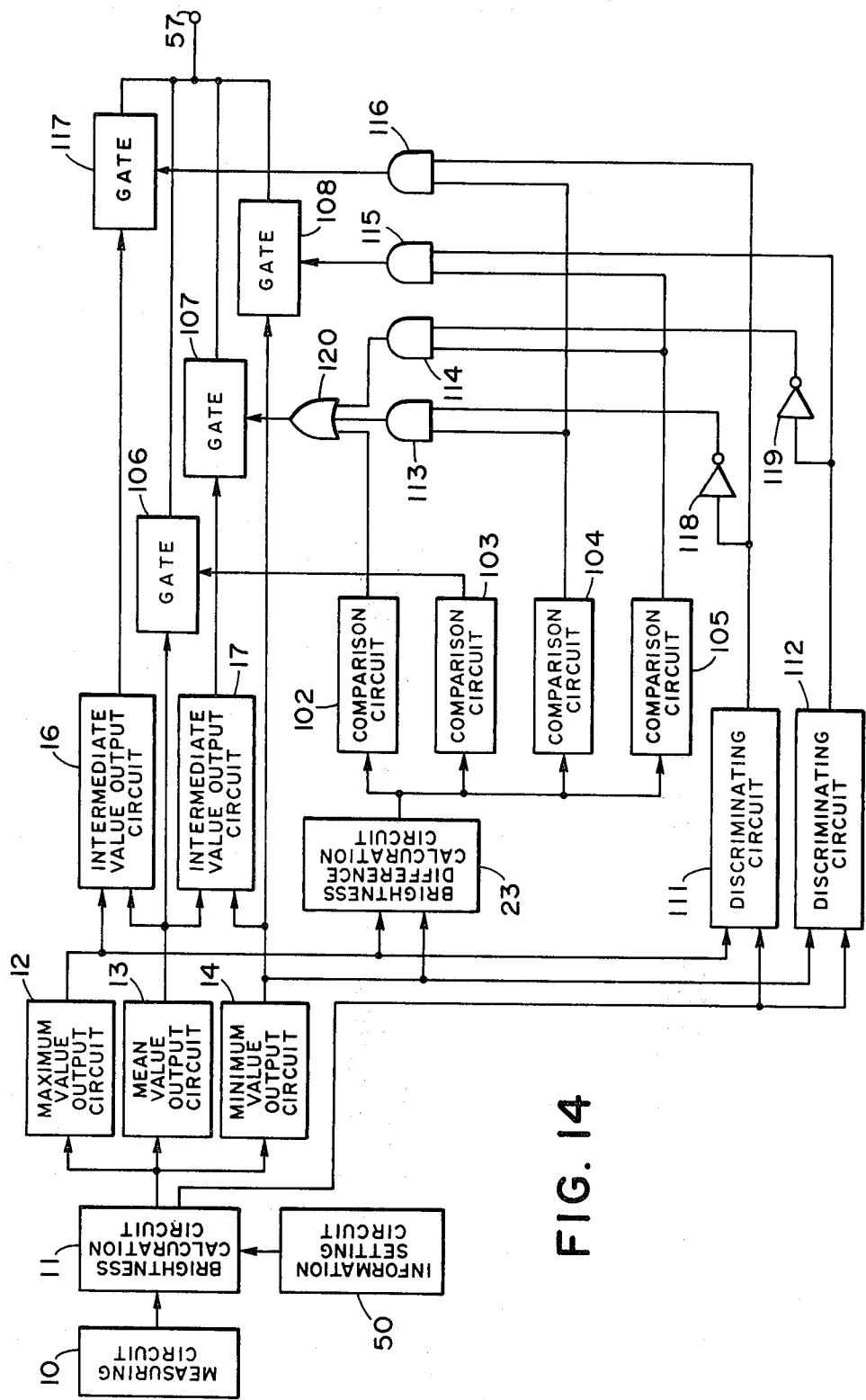
FIG. 14 is a block diagram of the device according to a fourth embodiment of the present invention.

A fourth embodiment shown in FIG. 14 is designed such that the operation of selection of the brightness to which the exposure in the embodiment of FIG. 13 is to be adjusted is partly correctable in accordance with the brightness condition of the central portion of the picture plane. That is, the brightness to which the exposure is to be adjusted is corrected by discriminating whether the center of the picture plane is close to the maximum brightness when the brightness difference is 5/3<dBV≦3 and by discriminating whether the center of the picture plane is close to the minimum brightness when the brightness difference dBV≦5/3.

A first discriminating circuit 111 receives as inputs the brightness $BV_0$ of the center of the picture plane and the maximum brightness BVmax, and discriminates whether the brightness $BV_0$ satisfies the condition that $$BV_0 \geq BVmax - a \text{ (a: constant)}.$$

When the brightness $BV_0$ satisfies this condition, it is often the case that the major object exists at the center of the picture plane and therefore, the brightness to which the exposure is to be adjusted is corrected from (BVmean+BVmin)/2 to (BVmax+BVmean)/2. That is, at this time, both comparison circuit 104 and the first discriminating circuit 111 put out "1" and therefore, AND gate 116 puts out "1" to open gate 117. The output (BVmax+Bvmean)/2 of intermediate value output circuit 16 appears at the terminal 57. On the other hand, inverting circuit 118 puts out "0" and therefore, AND gate 113 puts out "0" and the other comparison circuits 102, 103 and 105 put out "0" and thus, gates 106-108 are not opened. In contrast, when the brightness $BV_0$ does not satisfy the aforementioned condition, the first discriminating circuit 111 puts out "0" and therefore, AND gate 113 puts out "1". Thus, (BVmean+Bvmin)/2 is selected. The reason why such operation is effected is that in an object field for which comparison circuit 104 puts out "1", when the center of picture plane at which the major object may exist with high possibility is bright, the possibility with which adjusting the exposure thereto agrees with the photographer's intention.

A second discriminating circuit 112 receives as inputs the brightness $BV_0$ of the center of the picture plane and the minimum brightness BVmin, and discriminates whether the brightness $BV_0$ satisfies the condition that $$BV_0 \leq BVmin + a.$$

When the brightness $BV_0$ satisfies this condition, it means that the center of the picture plane is dark. Generally, the possibility of the major object existing at the center of picture plane is high and therefore, it can be judged that this case is a counter-light condition. Accordingly, the brightness to which the exposure is to be adjusted is the minimum value BVmin. That is, at this time, both comparison circuit 105 and the second discriminating circuit 112 put out "1" and therefore, AND gate 115 puts out "1" to open gate 108. In contrast, when the brightness $BV_0$ does not satisfy the aforementioned condition, comparison circuit 105 and the second discriminating circuit 112 put out "1" and "0", respectively, and therefore AND gates 115 and 114 put out "0" and "1", respectively. Thus, gate 107 is opened and (BVmean+BVmin)/2 is selected.

The corrections by the discriminating circuits 111 and 112 will be sufficient if they are effected when the brightness difference is 3<dBV≦5 and dBV≦5/3. This is because, in the case of an object field of other conditions, it is often meaningless in terms of its nature to adjust the exposure only to the center of the picture plane.

We claim:

1. A metering device for metering an object field by dividing it into a plurality of areas and a plurality of photosensitive means producing a plurality of metering outputs corresponding to the brightness of individual areas of said object field, said device including:
    (a) means for extracting from said plurality of metering outputs a plurality of reference outputs different in level from one another, said extracting means including a circuit for calculating a maximum value output corresponding to the maximum brightness value of the brightness of said areas, a circuit for calculating a minimum value output corresponding to the minimum brightness value of the brightnesses of said areas, a circuit for calculating a mean value output corresponding to the mean brightness value of the brightnesses of said areas, a circuit for calculating a first intermediate value output corresponding to the intermediate value of said maximum brightness value and said mean brightness value, and a circuit for calculating a second intermediate value output corresponding to the intermediate value of said minimum brightness value and said mean brightness value;
    (b) means for evaluating the level of at least one of said reference outputs; and
    (c) means responsive to said evaulating means to select and put out one of said reference outputs.

2. A metering device for metering an object field by dividing it into a plurality of areas and a plurality of photosensitive means producing a plurality of metering outputs corresponding to the brightness of individual areas of said object field, said device including:
    (a) means for extracting from said plurality of metering outputs a plurality of reference outputs different in level from one another, said extracting means includes a circuit for calculating a maximum value output corresponding to the maximum brightness value of the brightness of said areas, a circuit for calculating a minimum value output corresponding to the minimum brightness value of the brightnesses of said areas, a circuit for calculating a mean value output corresponding to the mean brightness value of the brightnesses of said areas;

(b) means for evaluating the level of at least one of said reference outputs, said evaluating means including a circuit for comparing the level of said maximum value output with a referential level, a circuit for producing a central output corresponding to the brightness of at least one area positioned substantially centrally of said object field, and a circuit for comparing said central output with each of said maximum value output and said minimum value output; and (c) means responsive to said evaluating means to select and put out one of said reference outputs.

3. A metering device for metering an object field by dividing it into a plurality of areas and a plurality of photosensitive means producing a plurality of metering outputs corresponding to the brightness of individual areas of said object field, said device including:

(a) means for extracting from said plurality of metering outputs a plurality of reference outputs different in level from one another, said extracting means includes a circuit for calculating a maximum value output corresponding to the maximum brightness value of the brightness of said areas, a circuit for calculating a minimum value output corresponding to the minimum brightness value of the brightnesses of said areas, a circuit for calculating a mean value output corresponding to the mean brightness value of the brightnesses of said areas, and a circuit for calculating an intermediate value output corresponding to the intermediate value of said maximum brightness value and said mean brightnesses value;

(b) means for evaluating the level of at least one of said reference outputs, said evaluating means including a circuit for producing an output representing the difference between said maximum value output and said minimum value output, and a circuit for comparing the level of said difference output with a referential level, said comparison circuit including a first comparison circuit for producing an output when said difference output is smaller than a predetermined level, a second comparison circuit for producing an output when said difference output exceeds another level greater than said predetermined level, and a third comparison circuit for producing an output when said difference output is between said predetermined level and said another level; and (c) means responsive to said evauating means to select and put out one of said reference outputs.

4. A metering device according to claim 3, wherein said selecting means includes:

(a) first gate means responsive to the output of said first comparison circuit to select said minimum value output;

(b) second gate means responsive to the output of said second comparison circuit to select said intermediate value output; and (c) third gate means responsive to the output of said third comparison circuit to select said mean value output.

5. A metering device for metering an object field by dividing it into a plurality of areas which comprising:

(a) means for generating a plurality of metering outputs corresponding to the brightness of individual areas of said object field;

(b) means for extracting from said plurality of metering outputs a plurality of reference outputs different in level from one another, said extracting means including means for calculating an intermediate value output corresponding to the intermediate value of the minimum brightness value of the brightness of said areas and the mean brightness value of the brightness of said areas;

(c) means for evaluating the level of at least one of said reference outputs; and (d) means responsive to said evaluating means to select and put out one of said reference outputs.

6. A metering device for metering an object field by dividing it into a plurality of areas, which comprises:

(a) a plurality of photoresponsive means generating metering outputs corresponding to the brightness of individual areas of said object field;

(b) means for extracting from said metering outputs a plurality of reference outputs different in level from one another, said extracting means including:

a circuit for calculating a maximum value output corresponding to the maximum brightness value of the brightness of said areas, a circuit for calculating a minimum value output corresponding to the minimum brightness value of the brightnesses of said areas, a circuit for calculating a mean value output corresponding to the mean brightness value of the brightnesses of said areas, a circuit for calculating a first intermediate value output corresponding to the intermediate value of said maximum brightness value and said mean brightness value, and a circuit for calculating a second intermediate value output corresponding to the intermediate value of said minimum brightness value and said mean brightness value;

(c) means for evaluating the level of one of said reference outputs, said evaluating means including means for comparing the level of said one reference output with a referential level; and (d) means responsive to said evaluating means to select and put out one of said reference outputs.

7. A metering device according to claim 6, wherein said evaulating means evaluates the level of said maximum value output.

8. A metering device for metering an object field by dividing it into a plurality of areas, which comprises:

(a) a plurality of photoresponsive means generating metering outputs corresponding to the brightness of individual areas of said object field;

(b) means for extracting from said metering outputs a plurality of reference outputs different in level from one another, said extracting means including:

means for calculating a first intermediate value output corresponding to the intermediate value of the maximum brightness value of the brightness of said areas and the mean brightness value of the brightness of said areas; and means for calculating a second intermediate value output corresponding to the intermediate value of the minimum brightness value of the brightness of said areas and said mean brightness value of the brightness of said areas;

(c) means for evaluating the level of one of said reference outputs, said evaluating means including means for comparing the level of said one reference output with a referential level; and (d) means responsive to said evaluating means to select and put out one of said reference outputs.

9. A metering device for metering an object field by dividing it into a plurality of areas, which comprises:

(a) a plurality of photoresponsive means generating metering outputs corresponding to the brightness of individual areas of said object field;

(b) means for extracting from said metering outputs a plurality of reference outputs different in level from one another, said extracting means including means for calculating a maximum value output corresponding to the maximum brightness value of the brightness of said areas and means for calculating a minimum value output corresponding to the minimum brightness value of the brightness of said areas, and said evaluating means further includes means for producing a central output corresponding to the brightness of at least one area positioned substantially centrally of said object field and means for comparing said central output with each of said maximum value output and said minimum value output;

(c) means for evaluating the level of one of said reference outputs, said evaluating means including means for comparing the level of said one reference output with a referential level; and (d) means responsive to said evaluating means to select and put out one of said reference outputs.

* * * * *

UNITED STATES PATENT AND TRADEMARK OFFICE
CERTIFICATE OF CORRECTION

PATENT NO. : 4,412,730

DATED : November 1, 1983

INVENTOR(S) : TAKASHI SAEGUSA, ET AL.

It is certified that error appears in the above-identified patent and that said Letters Patent is hereby corrected as shown below:

Column 3, line 37, after "(j = 0-4)" insert --from the--;
          line 50, "$\leq$" should be --$\geq$--;
          line 51, "$\geq$" should be --$\leq$--;
          line 58, "$\leq$" should be --$\geq$--.

Column 5, line 36, "$\leq$" should be --$\geq$--.

Column 7, line 55, ">" should be --<--;
          line 63, after "of" insert --the--.

Signed and Sealed this

Third Day of January 1984

[SEAL]

Attest:

GERALD J. MOSSINGHOFF

Attesting Officer      Commissioner of Patents and Trademarks